(No Model.)

W. T. HAMAR & C. G. ARTHUR.
SAFETY APPLIANCE FOR AIR BRAKE COUPLINGS.

No. 600,641. Patented Mar. 15, 1898.

Witnesses
L. F. Hayden
Edward S. Wood

Inventors
Wm. T. Hamar
Chas. G. Arthur
By Attorney

UNITED STATES PATENT OFFICE.

WILLIAM T. HAMAR AND CHARLES G. ARTHUR, OF ATLANTA, GEORGIA.

SAFETY APPLIANCE FOR AIR-BRAKE COUPLINGS.

SPECIFICATION forming part of Letters Patent No. 600,641, dated March 15, 1898.

Application filed August 8, 1893. Serial No. 482,689. (No model.)

*To all whom it may concern:*

Be it known that we, WILLIAM T. HAMAR and CHARLES G. ARTHUR, citizens of the United States of America, and residents of Atlanta, in the county of Fulton and State of Georgia, have invented certain new and useful Improvements in Safety Appliances for Air-Brake Couplings; and we do hereby declare the following to be a full, clear, and exact description of our invention, such as will enable others skilled in the art to which it appertains to make and use the same, reference being had to the accompanying drawings, and to letters of reference marked thereon, which form a part of this specification.

This invention relates to air-brakes, and more particularly to that part of such devices known as "hose-couplings," said hose and coupling forming part of the train-pipe connecting the main and auxiliary reservoirs, said pipe, hose, and couplings joining said pipe between the several cars, the invention consisting of a valve automatically operating to close the opening through the coupling on the parting of the train and perforated, as will be hereinafter described, whereby the brakes are automatically applied by causing a service action of the triple valve on the detached cars upon the breaking loose from the train of one or more of said cars, the details of all of which will be hereinafter fully specified.

Figure 1:
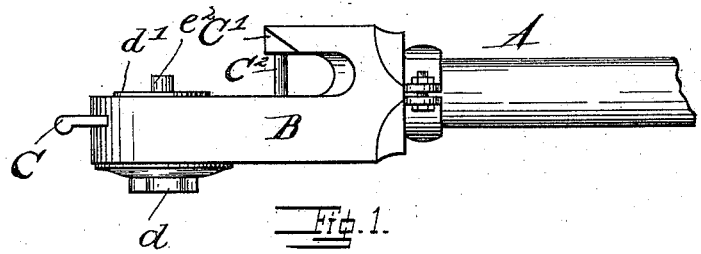
Figure 2:
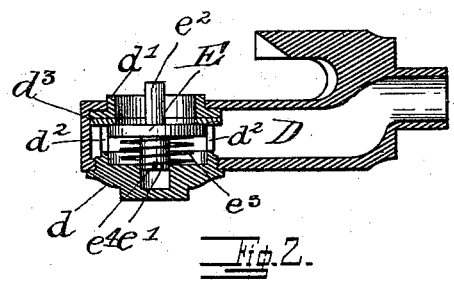
Figures 3, 4:
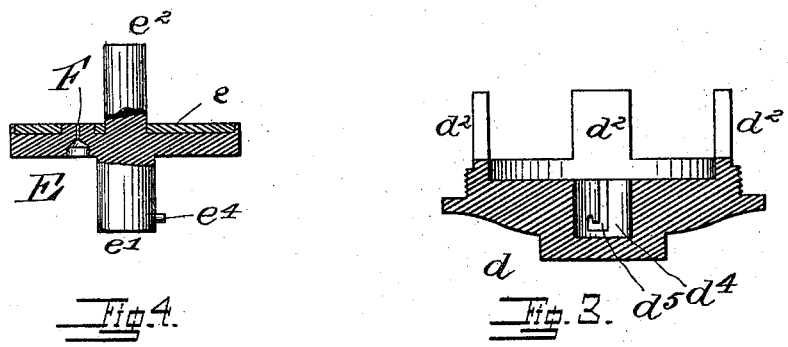
Figure 5:
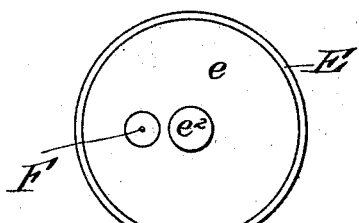

In the accompanying drawings, Figure 1 is a side elevation of the hose-coupling ordinarily in use at the present time, the abutting pin of the check-valve projecting as when closed. Fig. 2 is a longitudinal vertical section through the device, showing the interior arrangement of parts, with the exception of the small port in valve. Fig. 3 is a sectional view of the nut of the coupling, showing the offset groove therein; and Fig. 4 is a sectional view of the valve on the same plane, showing the pin for engaging said offset slot and also the port through the valve. Fig. 5 is a plan of the valve.

In these several figures like reference-marks indicate corresponding parts in all the views.

A is the hose; B, the coupling, which is, as usual, provided with lips C and C' and a stop-pin $C^2$, the functions and construction of which are well known and immaterial to the proper operation of this device, the sole requirement being that the coupling shall have such means of sustaining it coupled as will release without breaking the couplings.

The coupling is provided with an inner recess D, and a transverse bore registers with the end thereof, one side of which is closed by a nut $d$ and the other of which is provided with a flanged rubber bushing $d'$, which is held in place by the prongs $d^2$ of the said nut, a metal ring $d^3$ intervening for stiffness of bearing and to form a seat for the check-valve E, which is faced with a rubber gasket $e$, as shown in Figs. 4 and 5, and provided with a pilot $e'$ and an abutting lug $e^2$, projecting, respectively, into the recess $d^4$ in the nut $d$ and outwardly through the opening above the said check-valve, the former serving as a guide and a motion-limiting stop to the motions of the valve and the latter forming in conjunction with the same lug of the coöperating coupling-head (whereby it is depressed) to hold the valves open against the action of the springs $e^3$ in each coupling-head under the valve. The prongs $d^2$ also act as guides for the movements of the check-valve. It will be obvious that the valves E will, when two coupling-heads are engaged, be opened by the abutment of the lugs $e^2$ and that as soon as the joinder is disrupted said valves will seat themselves immediately.

So far as now described specifically the device is substantially identical with the old (now generally disused) air-brake hose-coupling.

As thus far described, this device will operate to hold the brakes off and make "wild" cars of the detached portion of a train, as no air is allowed to escape from the train-pipe by the disruption of the connection of the hose on the parting of the draw-heads. If these valves are not used at all, an instantaneous emergency application of the brakes takes place on the disruption of the train and in both sections thereof, taking the front section entirely from the control of the engineer and frequently causing a rear end collision of the detached portion against the front portion of the train and in all cases a sudden stop shocking the passengers and straining every part of the rolling-stock.

This invention consists, mainly, in a perforation through the valve E, (said perforation being lettered F in the drawings,) the operation of said perforation being to allow a slow egress of air from the train-pipe, thereby reducing the pressure therein and causing such an operation of the triple valve as will apply the brakes in about four seconds, forming a regular service stop for the detached portion of the train. The engineer's valve being set in running position for keeping pressure in train-pipe and auxiliary reservoirs equalized will obviously feed the train-pipe of the forward portion of the train with air enough to counteract the leakage through the apertured valve at the rear of said portion of the train and so prevent any action of the triple valve and keep that portion of the train entirely under the engineer's control.

The recess $d^4$ in the nut $d$ is provided with an offset groove $d^5$, and the pilot $e'$ of the valve is provided with a pin $e^4$, which works in said groove, stopping short of the offset portion thereof when two couplings of this kind are joined, but when it is desired to connect to a coupling-head not provided with means for the depression of the check-valve E a trainman will simply depress the said check-valve with his fingers to the limit of the groove and partially revolve same, passing the pin $e^4$ into the offset portion of said groove, thereby locking the check-valve E open.

In addition to the advantages hereinbefore set forth, this device, besides excluding sand from the train-pipe, will effectually stop trainmen from testing the efficiency of the brakes from the rear end of the train. With this device in use the efficiency of the brakes must be tested in the proper manner, the manner in which they are applied—that is, with the engineer's valve. A leaky rotary valve in the engineer's brake-valve is by this device quickly detected by placing said valve in lap or blank position.

Having thus described our invention, what we claim as new, and desire to secure by Letters Patent of the United States, is—

1. In an automatic fluid-pressure brake system, the combination, with a train-pipe of a detachable coupling, means for preventing the escape of fluid from the train-pipe to effect an emergency application of the brakes when the detachable parts of the coupling are separated, and means for permitting, at the same time, a gradual escape of fluid from the train-pipe to effect a service application of the brakes.

2. The combination, with a train-pipe of an automatic fluid-pressure brake system, of an automatically detachable two-part coupling for connecting two sections of the train-pipe, a valve in each of the detachable parts of the coupling adapted to prevent an exhaust of fluid under pressure from the train-pipe when the parts of the coupling are separated, and a passage for the gradual escape of fluid from the train-pipe when the parts of the coupling are separated.

3. In a safety appliance for air-brakes, the combination with a train-pipe, of the coupling-head having a passage leading through the same and a valve-seat registering with the said passage, the spring-pressed check-valve mounted in the said seat and controlling the opening leading through the coupling-head, the said valve having an aperture of such size as to permit only a service application of the brake leading through the same, the pilot and the abutting lug projecting from the opposite sides of the check-valve respectively.

In testimony whereof we hereunto affix our signatures in presence of two witnesses.

WILLIAM T. HAMAR.
CHARLES G. ARTHUR.

Witnesses:
ALBERT P. WOOD,
EDWARD P. WOOD.